United States Patent [19]

Imase

[11] Patent Number: 5,454,277

[45] Date of Patent: Oct. 3, 1995

[54] INTERMITTENT TORQUE TRANSMISSION DEVICE

[76] Inventor: Kenji Imase, 1166, Mitsukuri, Fujioka-cho, Nishikamo-gun, Aichi-ken, Japan

[21] Appl. No.: 171,428

[22] Filed: Dec. 22, 1993

[30] Foreign Application Priority Data

Dec. 24, 1992 [JP] Japan .................................. 4-343655

[51] Int. Cl.⁶ .................................................. F16H 27/04
[52] U.S. Cl. .............................................. 74/84 R; 74/464
[58] Field of Search ....................... 74/84 R, 424.8 NA, 74/464

[56] References Cited

U.S. PATENT DOCUMENTS

| | | | |
|---|---|---|---|
| 3,181,378 | 5/1965 | Petroff | 74/84 R |
| 3,181,379 | 5/1965 | Petroff | 74/84 R |
| 3,587,339 | 6/1971 | Gilbert | 74/464 X |
| 4,229,983 | 10/1980 | Morita | 74/424.8 NA X |
| 4,448,093 | 5/1984 | Moller | 74/84 R X |
| 4,541,786 | 9/1985 | McLean | 384/527 X |
| 4,634,300 | 1/1987 | Takebayashi et al. | 384/548 |
| 4,829,851 | 5/1989 | Imase | 74/798 |

FOREIGN PATENT DOCUMENTS

| | | | |
|---|---|---|---|
| 58-121345 | 7/1983 | Japan | 74/424.8 NA |
| 955901 | 4/1964 | United Kingdom | 74/84 R |

*Primary Examiner*—Allan D. Herrmann
*Attorney, Agent, or Firm*—Sughrue, Mion, Zinn, Macpeak & Seas

[57] ABSTRACT

In an intermittent torque transmission device, an input shaft is provided to have a cylindrical cam face. An output shaft has a wheel provided in a manner to intersect the input shaft. A plurality of recesses are provided on an upper surface of the wheel along a predetermined base circle. A cam groove is provided on the cylindrical cam face of the input shaft. A spherical ball is rotatably provided in each of the recesses of the wheel while engaging against the cam groove so as to intermittently rotate the wheel of the output shaft in association with the rotational movement of the input shaft.

5 Claims, 9 Drawing Sheets

INTERMITTENT TORQUE TRANSMISSION DEVICE

BACKGROUND OF THE INVENTION

1. Field of the Invention

The invention relates to an intermittent torque transmission device which is capable of transmitting a greater torque with a relatively simple structure, and particularly is capable of insuring a precise torque transmission without sacrificing its entire compactness so as to comply with the needs of industry.

2. Description of the Prior Art

In modern robotic technology accommodated into various types of industrial machine tools, an index device has been associated with an electric motor in a form of an intermittent torque transmission device. The device intermittently transmits its torque for application to a transfer of robotic arms.

Figure 9:
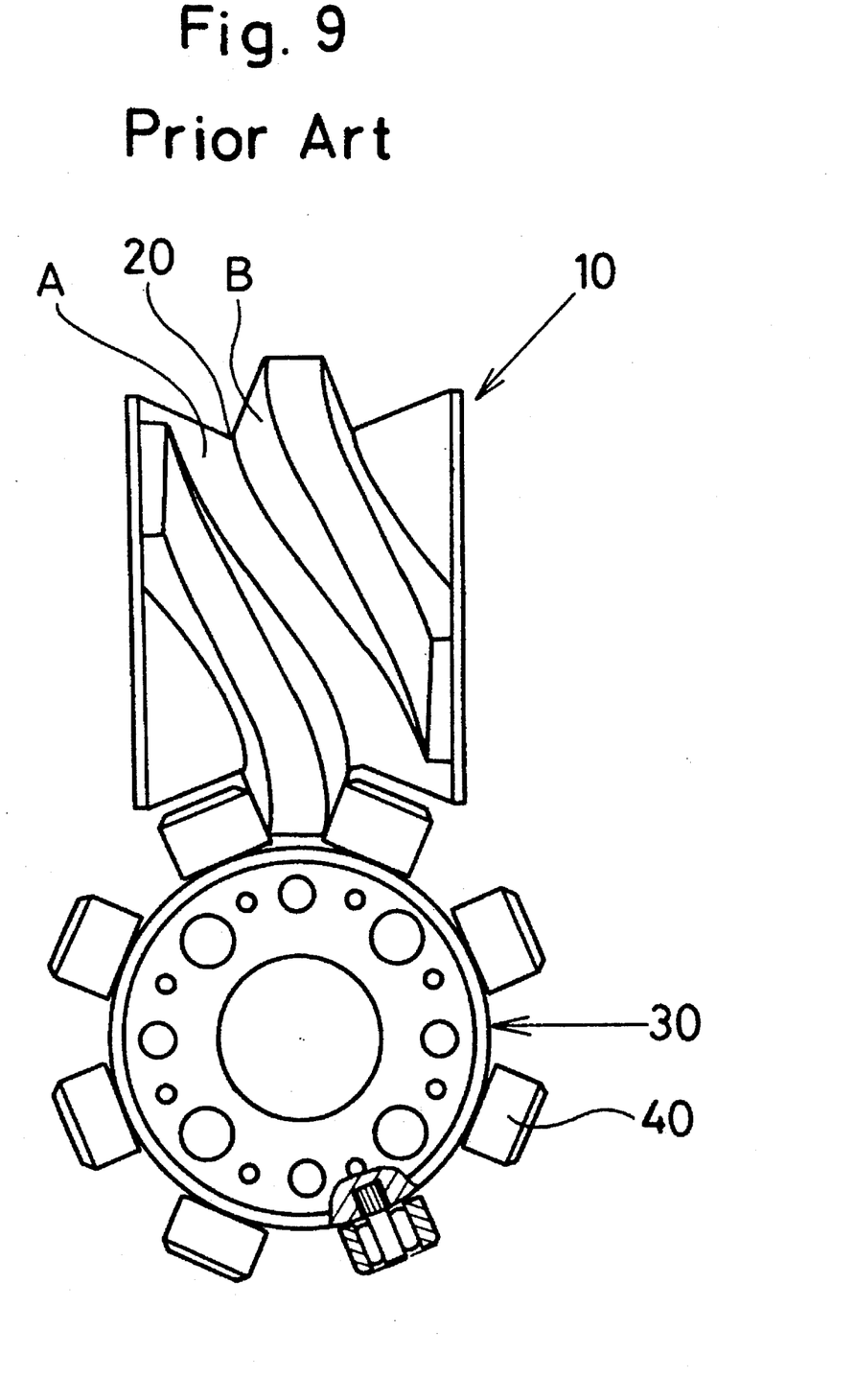
FIG. 9 is a plan view of a prior art intermittent torque transmission device.

One example of the intermittent torque transmission device is shown in FIG. 9 in which a drive wheel 10 has a groove 20 having cam faces (A), (B) at both walls of the cam groove 20. A driven wheel 30 has cam followers in the form of rollers 40. The rollers 40 are provided at the circumferential periphery of the driven wheel 30. The roller 40 runs along the cam faces (A), (B) in turn in combination with the movement of the drive wheel 10. In this instance, the movement of the driven wheel 30 ceases when the profile of the cam groove 20 is in accordance with the circumferential direction of the drive wheel 10 so as to effect intermittent rotational movement.

However, it has been desirable to improve this type of the intermittent torque transmission device particularly in the following points: (i) With the roller running along the cam faces (A), (B), the transmission torque is borne by a single shaft of the roller, thus making it likely to break the shaft when a greater transmission torque is imposed on the roller. This is also true upon making a compact type of the intermittent torque transmission device. (ii) It is generally difficult to precisely machine the profile of the cam face on which the roller engages. This requires a highly skilled technique and expensive machines to substantially eliminate a backlash play between the roller and the cam face.

In connection with this type of the intermittent torque transmission device, a speed reducer device has been introduced to provide (a) a high reduction ratio with compact structure, (b) a high controlling precision with minimum play of backlash, (c) an elevated rigidity with high meshing rate, (d) an easy controllability improved with a relatively small inertia force, (e) a minimum loss of torque with minimum wear.

This type of the speed reducer device satisfying these advantages (a)–(e) is shown in U.S. Pat. No. 4,829,851 patented on May 16, 1989 which corresponds to Japanese Patent Application No. 141963/60 filed on Jun. 27, 1985. In this patent, are first and second discs provided each surface of which has a groove defined by a cycloidal-based curve. A plurality of balls are provided to roll along each groove of the first and second discs when a rotational movement is transmitted to the second disc so as to impart the second disc with a nutational movement. A rectifier disc picks up a rotational movement from the nutational movement of the second disc to produce a reduced output.

It is, however, desirable to ensure a greater reduction ratio up to $1/50$–$1/100$ in a reducer device particularly employed to machine tools. From the point of strength and machinability, it is thought difficult for the prior reducer to ensure such a great reduction ratio without sacrificing its compactness.

Therefore, it is a main object of the invention to provide an intermittent torque transmission device which is capable of readily machining a cam groove, and achieving a high controlling precision with a minimum play of backlash, a high rigidity with a high meshing degree, an improved controllability with small inertia force and a greater transmission torque with a compact structure.

SUMMARY OF THE INVENTION

According to the present invention, there is provided an intermittent torque transmission device comprising: an input shaft having a cylindrical cam face which is rotatably supported in a housing; an output shaft having a wheel which is provided in a manner to intersect the input shaft in the housing; a plurality of recesses provided on an upper surface of the wheel along a predetermined base circle; a cam groove provided on the cylindrical cam face of the input shaft, the cam groove being made along cam profiles consisting of drive curves and an idle curve continuously provided between the drive curves, the drive curves changing along an axial direction of the input shaft while the idle curve remain unchanged along the axial direction of the input shaft; and a spherical ball rotatably provided in each of the recesses of the wheel while engaging against the cam groove so as to intermittently rotate the wheel of the output shaft in association with rotational movement of the input shaft.

According further to the present invention, there is provided an intermittent torque transmission device wherein a cross section of the cam groove is such that the spherical ball is brought in two-point contact with the cam groove.

According still further to the present invention, there is provided an intermittent torque transmission device comprising: an input shaft having a hyperbolic paraboloidal cam face which is rotatably supported in a housing; an output shaft having a wheel which is provided in a manner to intersect the input shaft in the housing; a plurality of recesses provided on an outer peripheral side of the wheel of the input shaft; a cam groove provided on the hyperbolic paraboloidal cam face of the input shaft, the cam groove being made along cam profiles consisting of drive curves and an idle curve continuously provided between the drive curves, the drive curves changing along an axial direction of the input shaft while the idle curve remain unchanged along the axial direction of the input shaft; and a spherical ball rotatably provided in each of the recesses of the wheel while engaging against the cam groove so as to intermittently rotate the wheel of the output shaft in association with rotational movement of the input shaft.

According further to the present invention, there is provided an intermittent torque transmission device wherein the spherical ball is made of a steel-based alloy or friction-resistant ceramic material.

With the cam groove substantially defined as a streak of straight profile, it is possible to readily machine the profile of the cam groove so as to significantly decreased the manufacturing cost. This is particularly advantageous upon reducing the device to mass production.

With a plurality of recesses defined as semi-spherical shape, it is possible to readily machine the recesses in the same manner as mentioned above.

With the torque transmission effected by way of the cam groove, the spherical ball and each of the recesses, it is possible to increase torque-sharing capability so as to transmit a greater torque with a relatively compact structure.

By increasing the number of the spherical balls provided on the wheel of the input shaft, it is possible to engage two or more balls with the cam groove so as to effect a great torque transmission with a compact structure.

With the wheel superposed with the cam face through the spherical ball, it is possible to substantially eliminate the backlash play between the ball and the cam groove.

BRIEF DESCRIPTION OF THE DRAWINGS

In order that the invention may be more clearly understood, the following description is given by way of example only, with reference to the accompanying drawings in which.

DESCRIPTION OF THE PREFERRED EMBODIMENTS OF THE INVENTION

Referrring to FIGS. 1 through 5 which shows an intermittent torque transmission device 1 according to a first embodiment of the invention, the intermittent torque transmission device 1 has a parallelopiped on housing 2 having a main body 24 and a side plate 25 fixed to the main body 24 by way of illustration. It stands as a matter of course that the shape of the housing is selected freely as required.

The housing 2 has a lateral space 21 and vertical space 22 (see FIGS. 3 and 5) to dispose an input shaft 3 and an output shaft 5 respectively to form a common space 23 in which the two spaces 21, 22 intersect.

In the intermittent torque transmission device 1, the input shaft 3 has a cylindrical cam face 34 on which a cam groove 4 is provided. The output shaft 5 has a driven wheel 51 in a manner to intersect the input shaft 3. A plurality of spherical balls 6 are provided between the cam groove 4 and the driven wheel 51 as described in detail hereinafter. The input shaft 3 is connected to a rotary shaft of an electric motor M by way of a speed reducer G. The output shaft 5 which extends upward beyond the housing 2, has a turn table (not shown) to intermittently move a work piece placed thereon.

Figure 1:
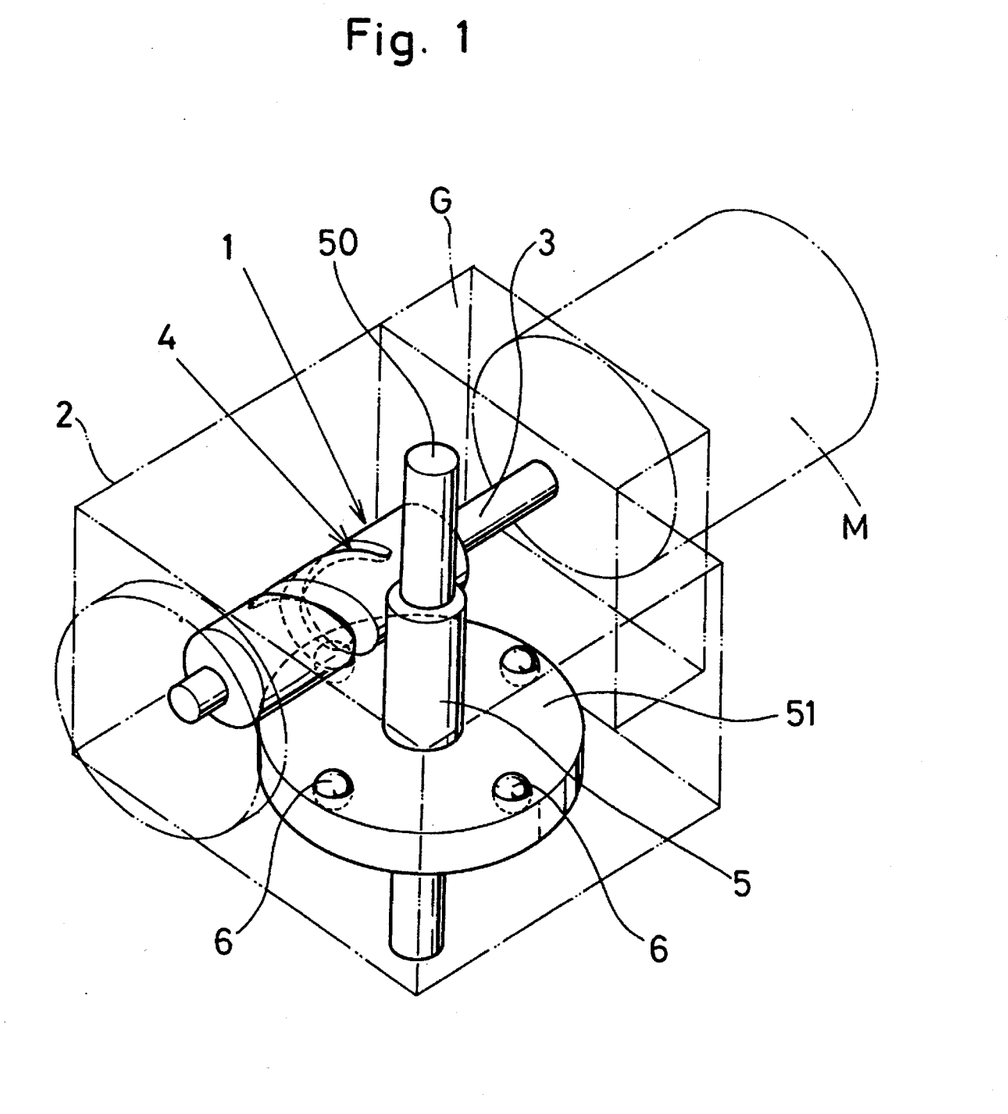
FIG. 1 is a perspective view of an intermittent torque transmission device according to a first embodiment of the invention.
Figure 2:
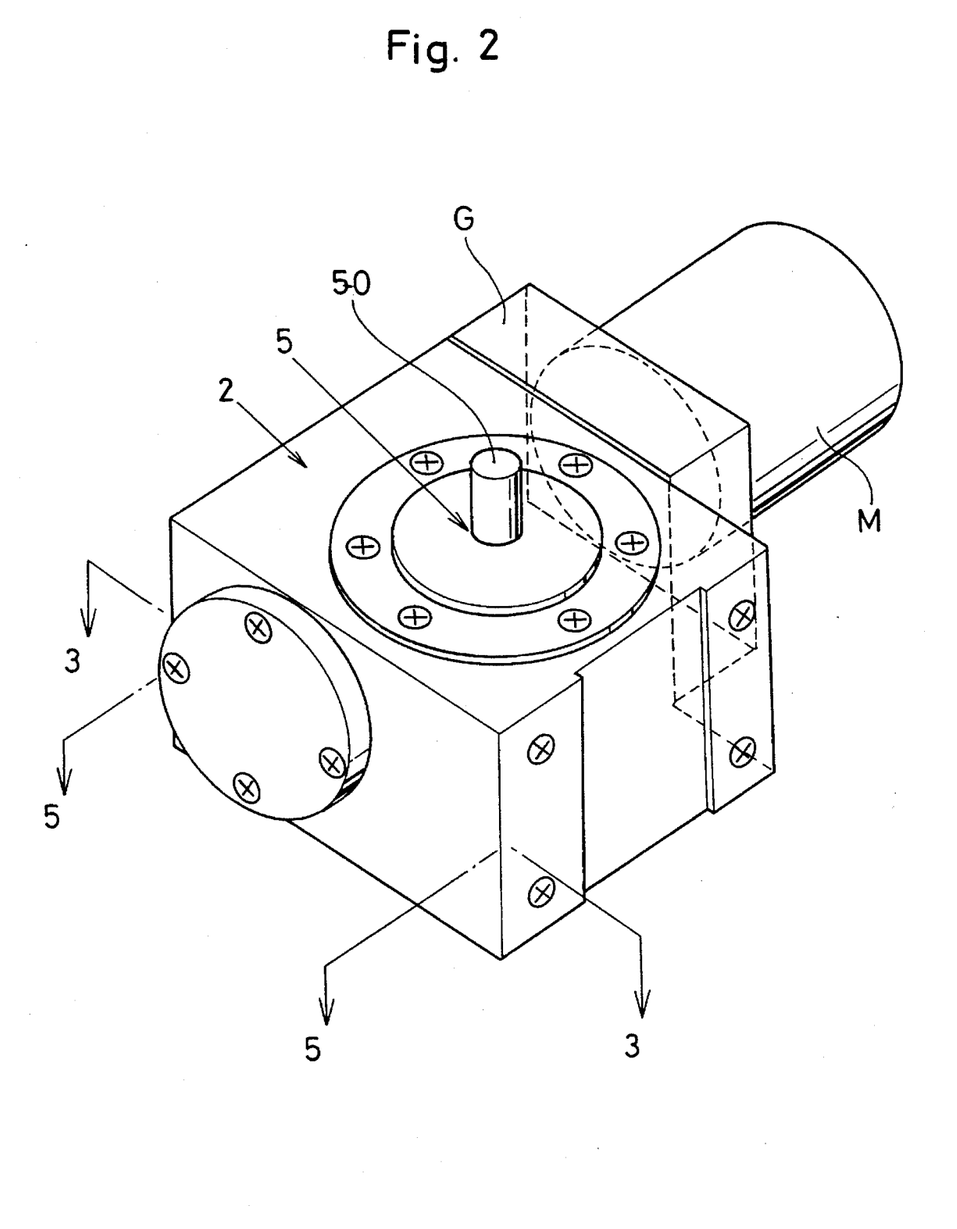
FIG. 2 is a perspective view of the intermittent torque transmission device depicted to particularly show its outer appearance.
Figure 3:
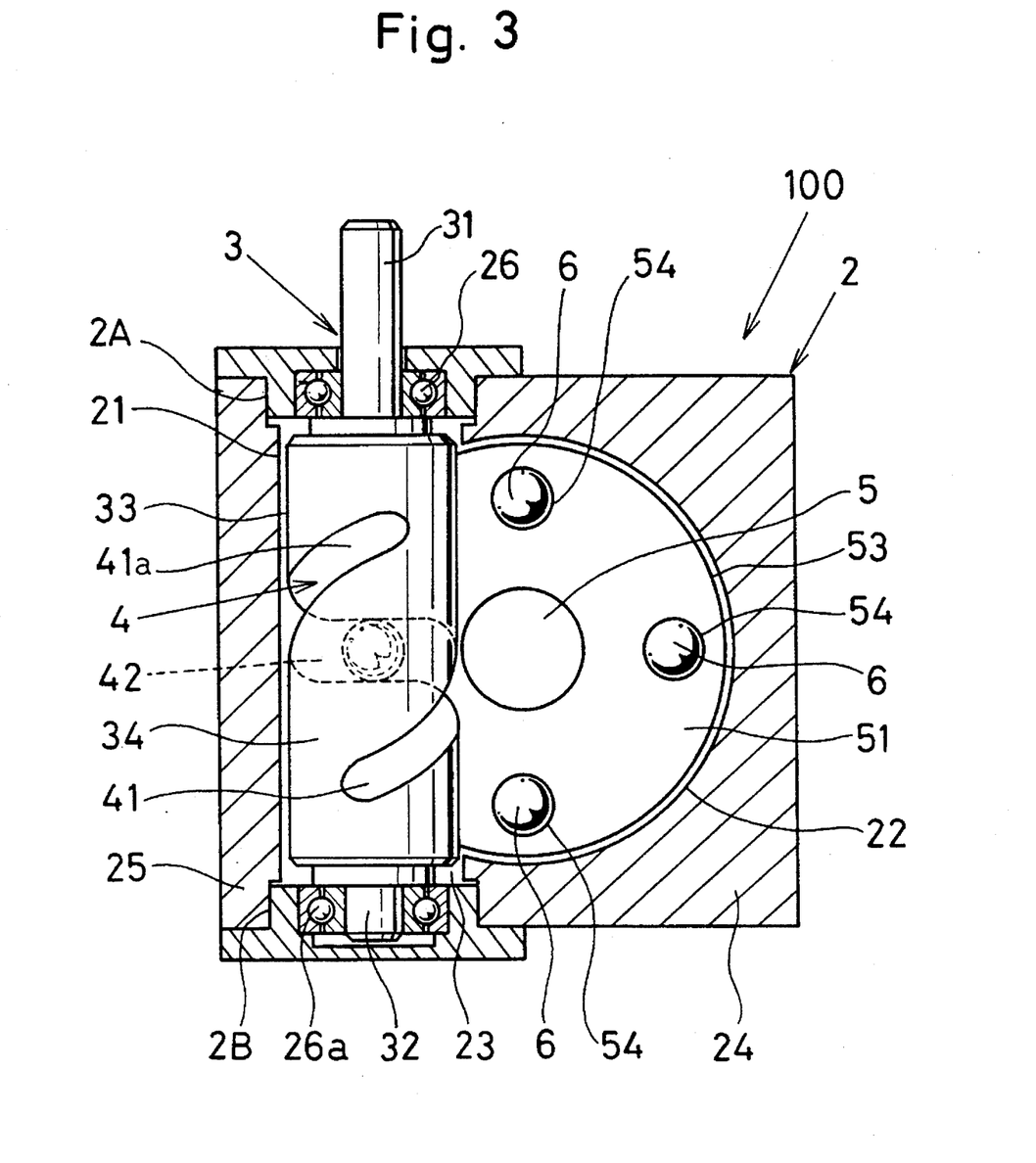
FIG. 3 is a longitudinal cross sectional view of the intermittent torque transmission device taken along the line 3a–3a of FIG. 2.
Figures 4, 10:
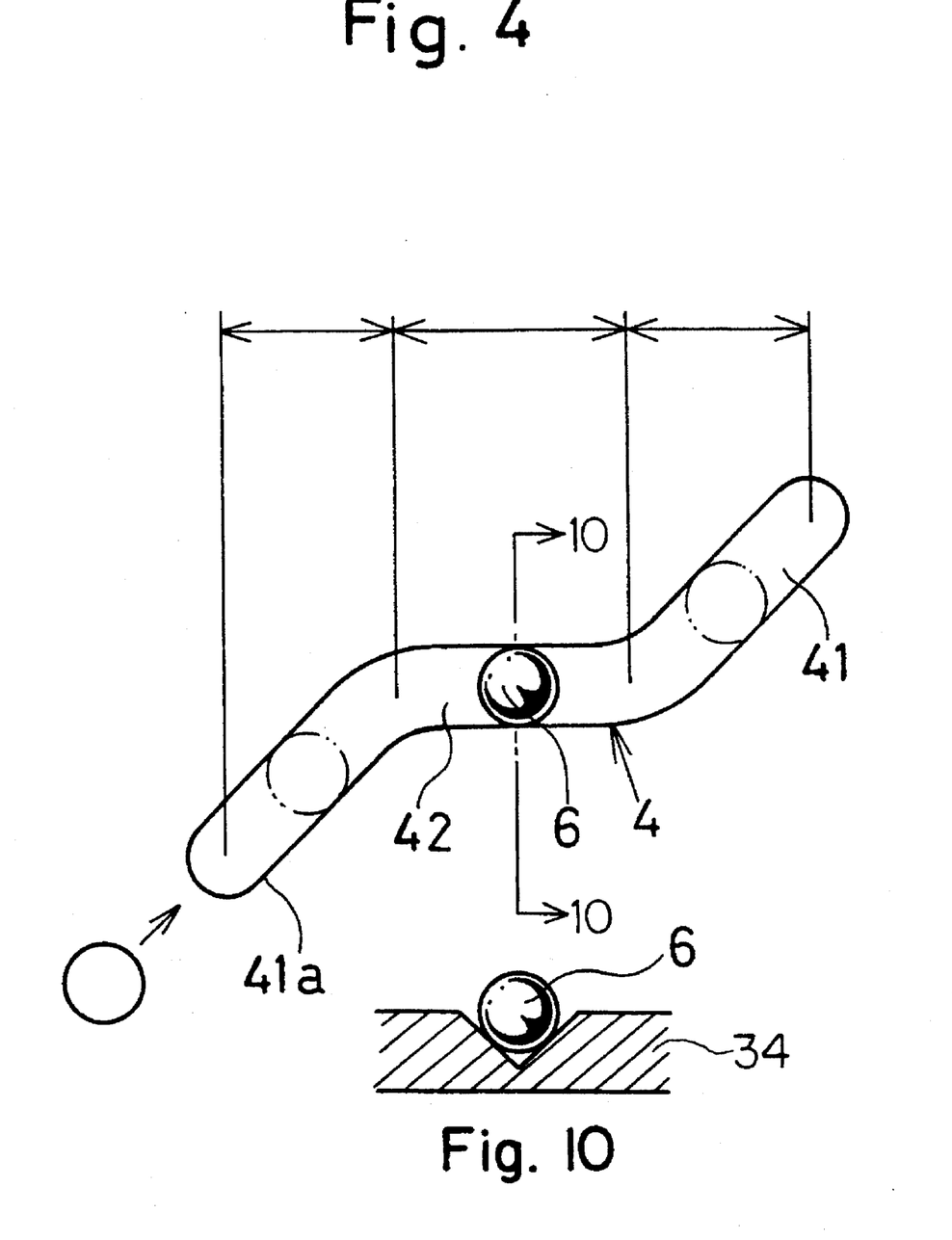
FIG. 4 is a view of development of a cam groove provided on the wheel of an input shaft.
FIG. 10 is a cross-sectional view of the intermittent torque transmission device input shaft taken along line 1c–1c of FIG. 9.
Figure 5:
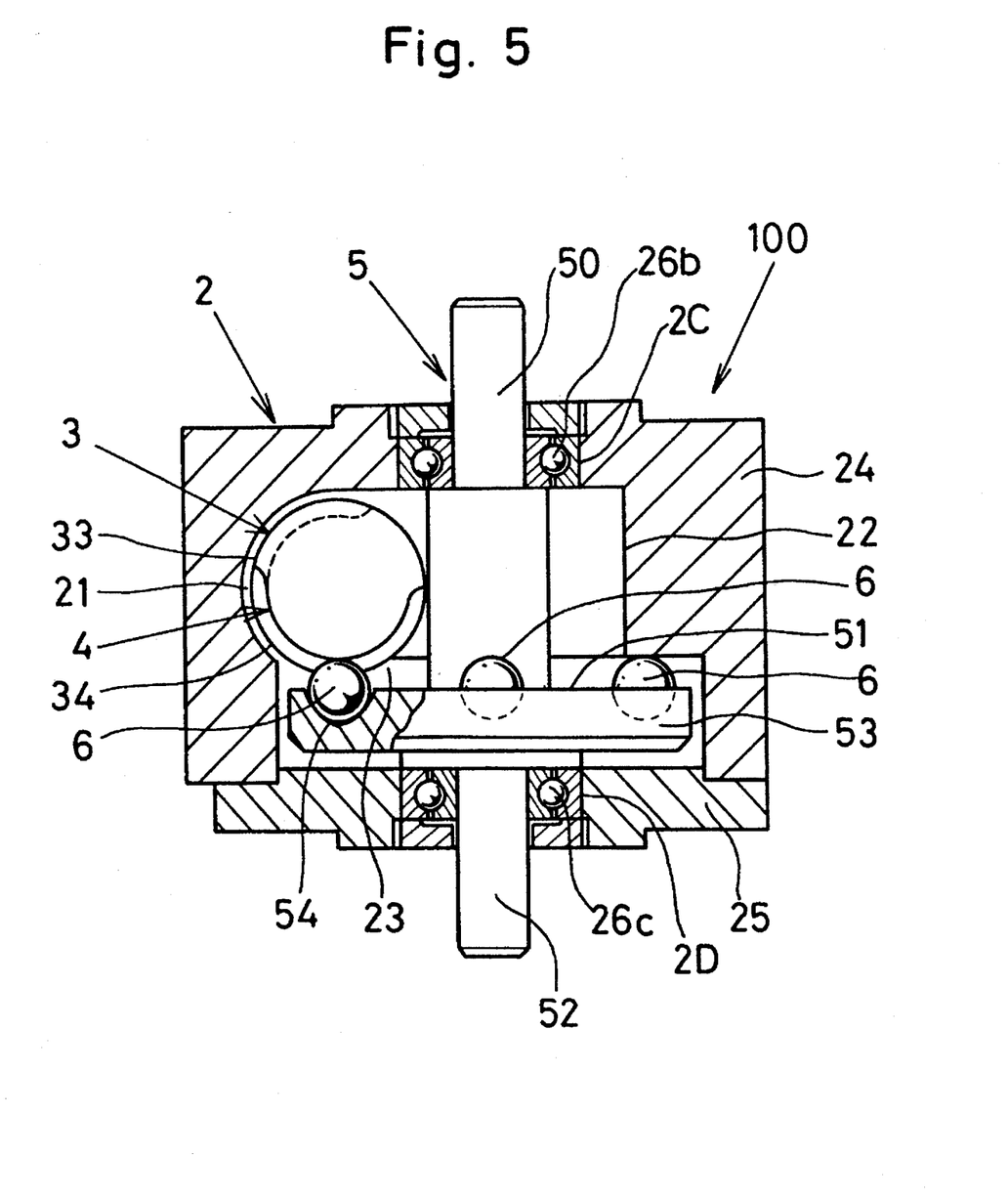
FIG. 5 is a longitudinal cross sectional view of the intermittent torque transmission device taken along the line 5a–5a of FIG. 2.

Meanwhile, first end 31 of the input shaft 3 is supported by a front wall 2A through a bearing 26, and a second end 32 of the input shaft 3 is supported by a rear wall 2B through a bearing 26a as shown in FIGS. 3 and 5. A middle portion of the input shaft 3 forms a diameter-increased portion 33 to provide the cylindrical cam face 34. The cam groove 4 is made along cam profiles consisting of drive curves 41, 41a and an idle curve 42 continuously provided between the drive curves 41, 41a, the drive curves appropriately change along an axial direction of the input shaft 3, while the idle curve 42 remain unchanged along the axial direction of the input shaft 3 as shown particularly in FIG. 4. In this instance, as illustrated in FIG. 10, a cross section of the cam groove 4 is preferably in the shape of a gothic arch so as to bring the ball 6 in two-point contact with the cam groove 4. It is noted that the cross section of the cam groove 4 may be arcuated which has a radius substantially equivalent to that of the ball 6.

An upper end 50 of the output shaft 5 is supported by a upper wall 2C through a bearing 26b, and the other end 52 of the output shaft 5 is supported by a lower wall 2D through a bearing 26c as also shown in FIGS. 3 and 5. The output shaft 5 has a saucer 53 in the common space 23 to serve as the wheel 51. On an upper surface of the wheel 51, four recesses 54 are provided along a predetermined base circle at regular intervals. In each of the recesses 54, the spherical ball 6 is rotatably retained. The spherical ball 6 is made of a steel-based alloy or a friction-resistant ceramic material which is obtained by sintering a mixture including aluminum nitride (AlN) and aluminum oxide ($Al_2O_3$) by way of example. Each of the spherical balls 6 is adapted to be alternately brought into engagement with the cam groove 4 in association with the movement of the driven wheel 51 of the input shaft 3. It is observed that the number of the recesses 54 required for the ball 6 is at least three by taking the function of the torque transmission device 1 into consideration.

With the structure this far described, the energized motor M moves the input shaft 3 in one direction through the speed reducer G to rotate the cam face 34, so as to intermittently transmit the torque to the wheel 51 by way of the spherical ball 6. When the ball 6 runs along the drive curves 41, 41a of the cam groove 4, the ball 6 cause the wheel 51 to rotate, but the wheel 51 comes to a stand still when the ball 6 runs along the idle curve 42 of the cam groove 4. The incoming ball is successively brought into engagement with the cam groove 4 immediately before the preceding ball is out of the engagement with the cam groove 4.

In this instance, the radius of curvature of the ball 6 is slightly greater than that of the recesses 54, and the ball 6 is brought in two-point contact with the cam groove 10 as shown in FIG. 4.

The two-point contact of the ball makes it possible to prevent the ball from rattling in the axial direction of the input shaft 3. It is possible to substantially eliminate the backlash by appropriately arranging the spaced dimension between the cylindrical cam face 34 of the input shaft 3 and the wheel 51 of the output shaft 5. The required number of the ball 6 can be reduced as small as three by increasing the superposing portion between the cylindrical cam face 34 of the input shaft 3 and the wheel 51 of the output shaft 5. It is also possible to increase the required number of the balls by enlarging the diameter of the wheel 51 and the axial length of the cam face 34.

Figure 6:
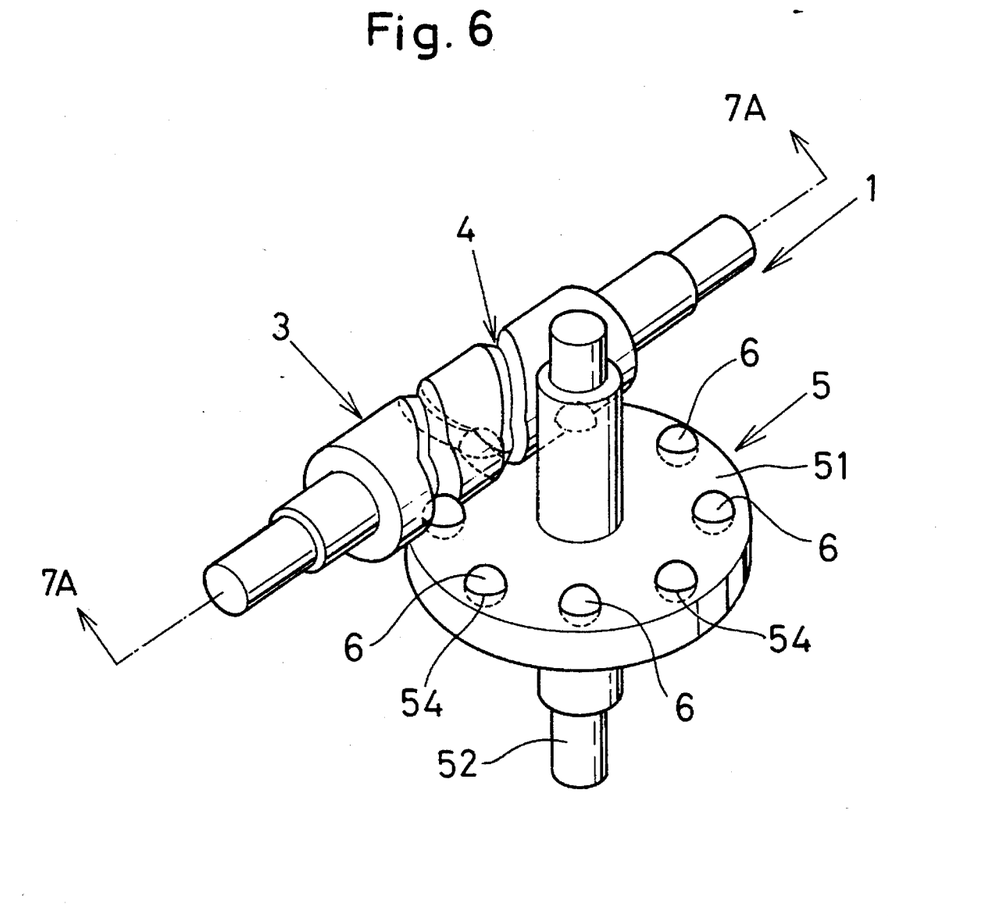
FIG. 6 is a perspective view of a main portion of an intermittent torque transmission device according to a second embodiment of the invention.
Figure 7:
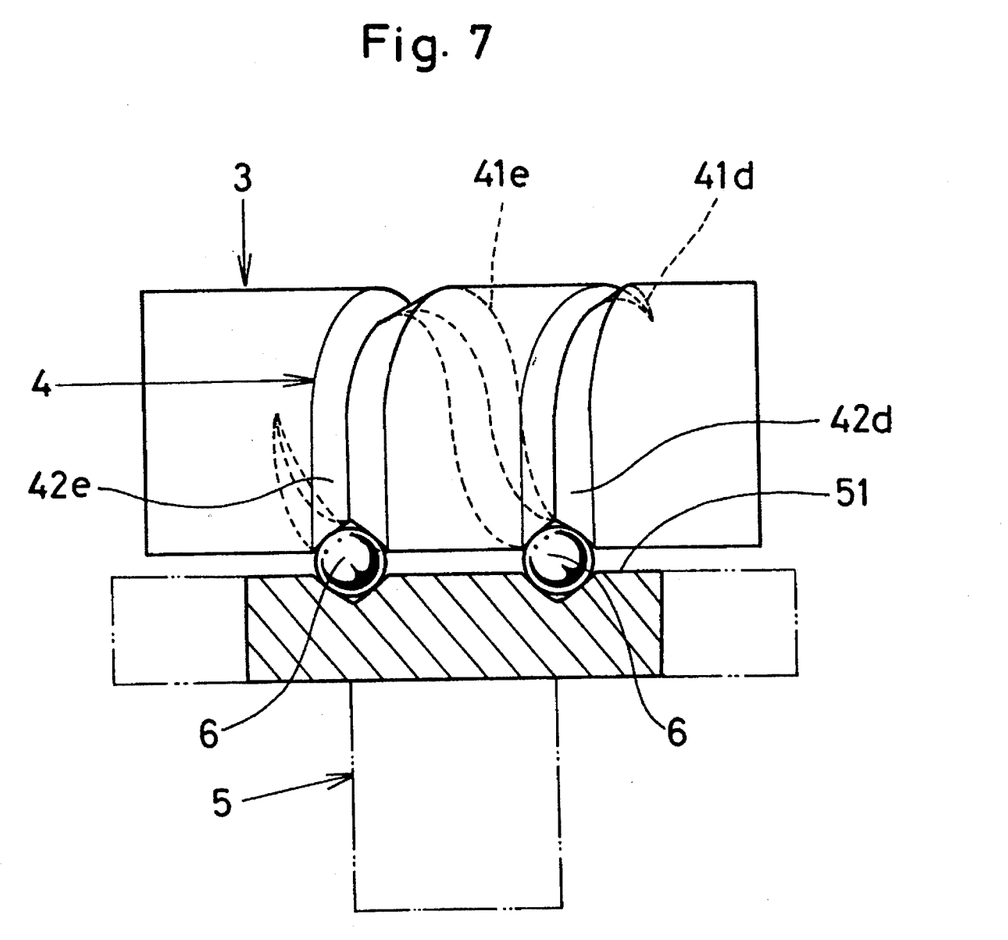
FIG. 7 is an enlarged longitudinal cross sectional view of the intermittent torque transmission device taken along the line 7a–7a of FIG. 6.

FIGS. 6, 7 show a second embodiment of the invention in which eight balls 6 are in turn placed in the recesses 54 provided on the wheel 51 of the output shaft 5. The cam groove 4 has a series cam profile consisting of a drive curve 41d, an idle curve 42d, a drive curve 41e and an idle curve 42e. This cam profile makes it possible to simultaneously engage two balls with the cam groove 4, thus enabling to effect a greater torque transmission.

Figure 8A:
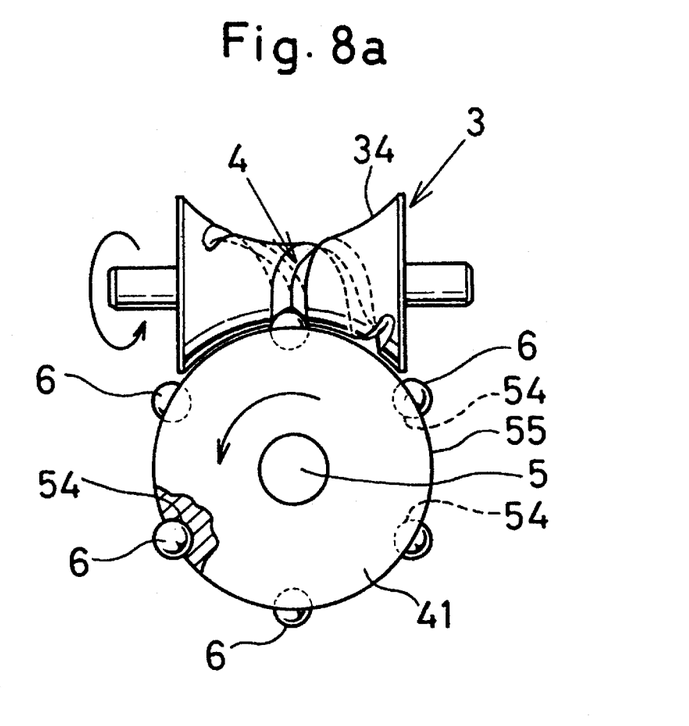
FIGS. 8a, 8b are each plan view of a main portion of an intermittent torque transmission device according to a third embodiment of the invention.
Figure 8B:
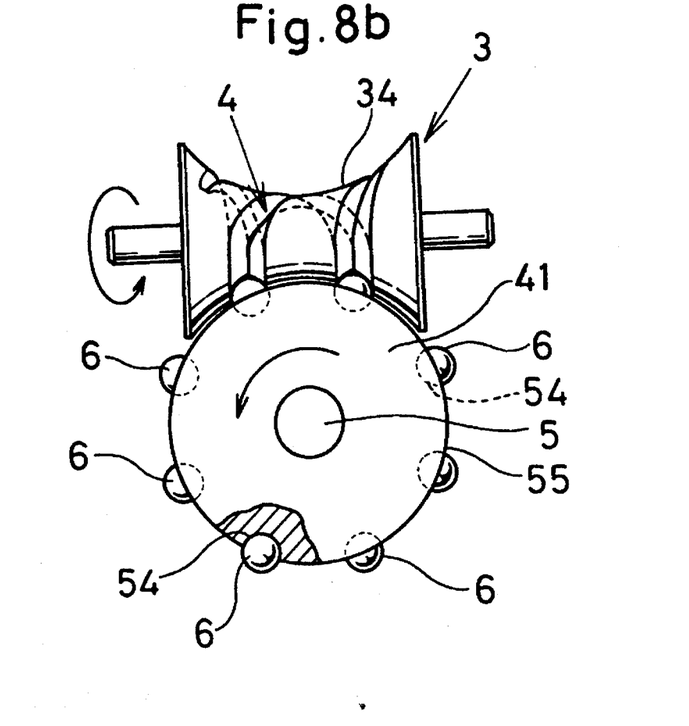

FIGS. 8a, 8b show a third embodiment of the invention in which the cam face 34 of the input shaft 3 is in the form of hyperbolic paraboloidal configuration instead of the cylindrical shape. The hyperbolic paraboloidal cam face has the cam groove 4, and the radius of curvature of the cam face 34 is substantially equivalent to that of the wheel 51. The spherical ball 6 is rotationally placed in each of the recesses 54 which are provided on an outer peripheral side 55 of the wheel 51 at regular intervals.

This structure makes it somewhat difficult to machine the cam face 34 and cam groove 4 compared to those of the first embodiment of the invention. Except for this point, the same advantages are obtained as insured in the first embodiment of the invention.

Further, with the enhancement of the load-burdening capability, it becomes unnecessary to make the wheel 51 from a hard iron-based metal, thus reducing cost of material and machining the recesses 54 for a short period of time with a high precision.

It is, further, possible to machine the recesses 54 rapidly with a simple operation as opposed to the prior counterpart in which it is necessary to machine the cam faces (A), (B) of the drive wheel 10.

As understood from the foregoing description, the invention enables to provide an intermittent torque transmission device which is capable of achieving a high controlling precision with a minimum backlash, a high rigidity with a high meshing rate, an improved controllability with small inertia force and a greater torque-sharing capability with a compact structure.

It is appreciated that a cage or a retainer may be used to hold the spherical balls 6 in position particularly when the ball 6 are rotationally placed in each of the recesses 54 which are provided on an outer peripheral side 55 of the wheel 51.

It is further observed that the cross section of the recess may be in the form of Gothic arch to bring the ball 6 into two-point contact the recess.

It is also noted the cam face may be made from tough and wear-resistant ceramic material with silicon nitride as a main component.

It is appreciated that discrete projections may be individually prepared, and these projections are integrally bonded to the portions in which the recesses are provided. In this instance, a thrust bearing may be placed so as to reduce friction between the groove and the projections.

Furthermore, it is noted that these projections may be arranged on the wheel at irregular intervals, since the projections are not necessarily arranged at regular intervals.

It is observed that the cam face and the wheel may be made of lightweight ceramic material to insure swift starting with low inertia.

The speed reducer device embodied by the invention may be employed to industrial machine tools and various types of equipments.

While the invention has been described with reference to specific embodiments, it is understood that this description is not to be construed in a limitting sense in as much as various modifications and additions to the specific embodiments may be made by skilled artisan without departing from the spirit and scope of the invention.

What is claimed is:

1. An intermittent torque transmission device comprising:
   an input shaft, having a cylindrical cam face, which is rotatably supported in a housing;
   an output shaft having a wheel which is provided in a manner to intersect the input shaft in the housing;
   a plurality of recesses provided on an upper surface of the wheel along a predetermined base circle, said upper surface of the wheel being horizontally positioned;
   a cam groove provided on the cylindrical cam face of the input shaft, the cam groove being made along cam profiles consisting of drive curves and an idle curve continuously provided between the drive curves, the drive curves changing along an axial direction of the input shaft while the idle curve remains unchanged along the axial direction of the input shaft; and
   a spherical ball rotatably provided in each of the recesses of the wheel while engaging against the cam groove so as to intermittently rotate the wheel of the output shaft in association with rotational movement of the input shaft.

2. An intermittent torque transmission device as recited in claim 1, wherein a cross section of the cam groove is such that the spherical ball is brought in two-point contact with the cam groove.

3. An intermittent torque transmission device as recited in claim 1, wherein the spherical ball is made of a steel-based alloy or a friction-resistant ceramic material.

4. An intermittent torque transmission device as recited in claim 3, wherein the friction-resistant ceramic material is made by sintering a mixture including aluminum nitride (AlN) and aluminum oxide ($Al_2O_3$).

5. An intermittent torque transmission device comprising:
   an input shaft having a hyperbolic paraboloidal cam face which is rotatably supported in a housing;
   an output shaft having a wheel which is provided in a manner to intersect the input shaft in the housing, a radius of curvature of said hyperbolic paraboloidal cam face being substantially equivalent to that of said wheel;
   a plurality of recesses provided on an outer peripheral side of the wheel of the output shaft, said upper surface of the wheel being horizontally positioned;
   a cam groove provided on the hyperbolic paraboloidal cam face of the input shaft, the cam groove being made along cam profiles consisting of drive curves and an idle curve continuously provided between the drive curves, the drive curves changing along an axial direction of the input shaft while the idle curve remains unchanged along the axial direction of the input shaft; and
   a spherical ball rotatably provided in each of the recesses of the wheel while engaging against the cam groove so as to intermittently rotate the wheel of the output shaft in association with rotational movement of the input shaft.

* * * * *